United States Patent [19]

Kittel

[11] Patent Number: 4,579,212
[45] Date of Patent: Apr. 1, 1986

[54] CLUTCH DISC FOR A MOTOR VEHICLE FRICTION CLUTCH

[75] Inventor: Friedrich Kittel, Schweinfurt, Fed. Rep. of Germany

[73] Assignee: Fichtel & Sachs AG, Schweinfurt, Fed. Rep. of Germany

[21] Appl. No.: 581,954

[22] Filed: Feb. 21, 1984

[30] Foreign Application Priority Data

Feb. 23, 1983 [DE] Fed. Rep. of Germany ....... 3306281

[51] Int. Cl.$^4$ ........................ F16D 3/14; F16D 13/64
[52] U.S. Cl. .................................... 192/106.2; 464/68
[58] Field of Search ............... 192/106.2, 106.1, 70.17; 464/68, 66

[56] References Cited

U.S. PATENT DOCUMENTS

| | | | |
|---|---|---|---|
| 3,684,070 | 8/1972 | Maucher | 192/106.2 |
| 3,695,405 | 10/1972 | Maucher et al. | 192/106.2 |
| 4,368,812 | 1/1983 | Steeg | 192/106.2 |
| 4,398,625 | 8/1983 | Beccaris | 464/68 X |
| 4,496,036 | 1/1985 | Loizeau | 192/106.2 |

FOREIGN PATENT DOCUMENTS

| | | |
|---|---|---|
| 1475445 | 4/1972 | Fed. Rep. of Germany . |
| 2042680 | 9/1980 | United Kingdom . |

Primary Examiner—Leonard E. Smith
Attorney, Agent, or Firm—Toren, McGeady, Stanger, Goldberg & Kiel

[57] ABSTRACT

A friction clutch comprises a hub (1) and a friction lining carrier (5) mounted rotatably on the hub (1). A friction damper (27) includes a friction ring (29) between a hub disc (13) of the hub (1) and an axially adjacently arranged cover disc (9) of the friction lining carrier (5). A presser plate (33) is guided non-rotatably but axially displaceably on the friction lining carrier (5) between a further cover disc (7) of the friction lining carrier (5) and the axially opposite side of the hub disc (13). Between the cover disc (7) and the presser plate (33) a spring arrangement (37) is provided. Between the hub disc (13) and the presser plate (33) an oblique face thrust device (45, 47) is arranged which initially stresses the spring arrangement (37) in dependence upon the relative angle of rotation of the hub (1) and the friction lining carrier (5). The spring arrangement comprises two spring members (39, 41) arranged in series or parallel with one another, of which the one (41) is clamped in for every relative angle of rotation between the presser plate (33) and the cover disc (7) and determines the friction force in the idling range of the friction damper (27). The other spring member (39), which preferably has a harder spring characteristic, abuts on a stop part (cover disc 7) in the transition from the idling range to the under-load range and ensures a higher spring force in the under-load range. In the idling range this spring member (39) is lifted away from the stop part. In this way the friction force of the friction damper can be adjusted in the idling range to small spring forces, within narrow tolerances. Nevertheless high spring forces can be achieved in the under-load range.

18 Claims, 10 Drawing Figures

# CLUTCH DISC FOR A MOTOR VEHICLE FRICTION CLUTCH

BACKGROUND OF THE INVENTION

The invention relates to a clutch disc for a motor vehicle friction clutch and especially a clutch disc having a torsion spring damper and a torsion friction damper the friction force of which is controllable in dependence upon the torsion angle.

STATEMENT OF PRIOR ART

From DE-B-1,475,445 a clutch disc for a motor vehicle friction clutch is known in which a friction lining carrier is mounted on a hub for rotation about a limited angle of rotation. Torsional vibrations between the friction lining carrier and the hub are damped by damping springs on the one hand and a friction damper on the other. The friction damper comprises a friction ring resiliently clamped in between a hub disc of the hub and a cover disc of the friction lining carrier. On the cover disc there are formed dogs which engage in recesses of the friction ring and are guided out of the recesses over oblique faces of the recesses when a predetermined rotation angle range is exceeded. As long as the dogs are situated in the recesses the pressure application force and thus the friction force of the friction damper are low. When with increasing relative rotation the dogs emerge from the recesses, the friction force increases. The range of relative rotation angle with low friction force is employed in idling operation of the motor vehicle friction clutch, while the range of high friction force is dimensioned for the operation under load.

With the aid of the known clutch disc it is not possible adequately to fulfil the requirements made of vibration damping. In idling operation a very low friction force, defined however within narrow limits, should be generated. On transition into the under-load range the friction force should rise to a substantially higher value. In the known clutch disc the friction force is generated by the axial initial stress of the cover disc both in the idling range and in the range of operation under load. The spring properties of the cover disc must be so dimensioned that they ensure the high friction force of under-load operation. The rise of spring force is relatively steep in relation to the spring travel. In the idling range thus the spring force is greatly dependent upon installation tolerances and subject to great fluctuations.

It has further been attempted to generate the friction force of the friction damper by dished springs. Where dished springs are used which are sufficiently soft to be able to maintain sufficiently narrow limits of the friction force in the idling range, by reason of the great spring travel of such springs in the axial direction relatively wide clutch discs have to be accepted.

OBJECT OF THE INVENTION

An object of the invention is to improve the friction damper of the clutch disc of a motor vehicle friction clutch so that with relatively small axial dimensions of the friction damper a low friction force, maintained however within narrow limits, is generated in the idling range of the clutch disc, while in the under-load operation range a substantially higher friction force is generated.

SUMMARY OF THE INVENTION

A clutch disc according to the invention for a motor vehicle friction clutch comprises a hub which defines a rotation axis, a friction lining carrier guided rotatably on the hub and rotatable through a limited angle of rotation in relation to the hub about the axis of rotation, at least one damping spring stressable in the relative rotation of the hub and the friction lining carrier, a friction damper device operative on relative rotation of the hub and the friction lining carrier between these parts. The friction damper comprises at least two friction faces lying against one another and moving and rubbing against one another in the relative rotation, spring means determining the pressure application force of the friction faces and clamped in between the hub and the friction lining carrier, and an oblique face thrust device operative in the clamping path of the spring means for the control of the spring force exerted upon the friction faces in dependence upon the relative rotation angle between the hub and the friction lining carrier. The spring means comprises two spring members of which a first spring member at every relative rotation angle exerts a spring force upon the friction faces. The oblique face thrust device comprises a stop part arranged in the clamping path of the spring means. The stop part and the second of the two spring members are displaced in relation to one another by the oblique face thrust device in dependence upon the relative rotation angle between hub and friction lining carrier. The stop part is lifted away from the second spring member in a first range of the relative rotation angle and is abutting on the second spring member in at least one second range of the relative rotation angle in order to produce a spring force increased in comparison with the spring force exerted in the first range upon the friction faces.

The first range of the relative rotation angle is utilised in the idling operation of the friction clutch, the second range in the under-load operation. As long as the stop part is lifted away from the second spring member the friction force of the friction damper is substantially determined by the spring properties of the first spring member. Thus the spring means in all has a relatively soft spring characteristic which permits it to keep the friction force within relatively narrow tolerance limits in idling operation. As soon as the stop part abuts on the second spring member the spring means as a whole receives a comparatively hard spring characteristic in which the spring force varies greatly in dependence upon the spring travel. On transition into the under-load range thus a considerably greater spring force and thus also a considerably greater friction force are available.

In so far as it is explained above that the spring means of the friction damper is clamped in between the hub and the friction lining carrier, the spring means can be supported directly or equally through additional elements, especially of the friction damper, on the hub and the friction lining carrier.

The two spring members of the spring means can be arranged either in series with one another or parallel with one another in the spring force path. If the spring parts are arranged in series with one another, the first spring member is expediently softer than the second spring part. Then the deflection of the second spring member during stressing of the first spring member is so small as to be negligible. The stop part comes to abut on the second spring member, possibly through the first spring member, only after the maximum spring travel of the first spring member is used.

In the case of spring members arranged parallel with one another in the spring force path, in the under-load range the second spring member increases the hardness of the spring characteristic of the parallel spring arrangement. Here again the second spring member is preferably harder than the first spring member.

The second spring member consists preferably of a dished spring. The first spring member arranged in series with such a second spring member can be realised by leaf spring elements protruding radially from the dished spring or by a softer dished spring portion of the dished spring. The leaf spring elements or the softer dished spring portion are deflected first on loading of such a dished spring, while the harder dished spring portion becomes effective only after the exceeding of the maximum spring travel of the leaf spring elements or of the softer dished spring portion.

In an expedient development of the clutch disc according to the invention an initial stress element is allocated to the second spring member, by which it is loaded with a predetermined initial stress force even when the stop part is lifted away. In this way in the transition from the idling range the friction force generated by the spring arrangement can be modified abruptly.

In a preferred form of embodiment the oblique face thrust device is effective between a radial hub disc of the hub and a presser plate loaded by the spring means, axially displaceable but connected non-rotatably with the friction lining carrier. On the presser plate there can be mounted rollers or the like rotatable about radial rotation axes, which are supported on oblique faces of the hub disc. With such a configuration friction dampers can be realised with only one single friction ring. The friction forces occurring in the controlling of the friction damper are very small, so that the control system works exactly and wear is low.

The oblique faces of the oblique face thrust device can be relatively short and can be effective only in the transition region between the idling range and the under-load range. They can however also extend over the entire idling range and/or under-load range, so that the friction force of the friction damper can be controlled over the entire working range. By suitable selection of the cam form of the oblique faces it is possible, for example, to provide a friction force characteristic which firstly increases in the transition from the idling range to the under-load range and in the under-load range initially further increases and then may remain constant or decrease again as appropriate.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF PREFERRED EMBODIMENTS

Figure 1:
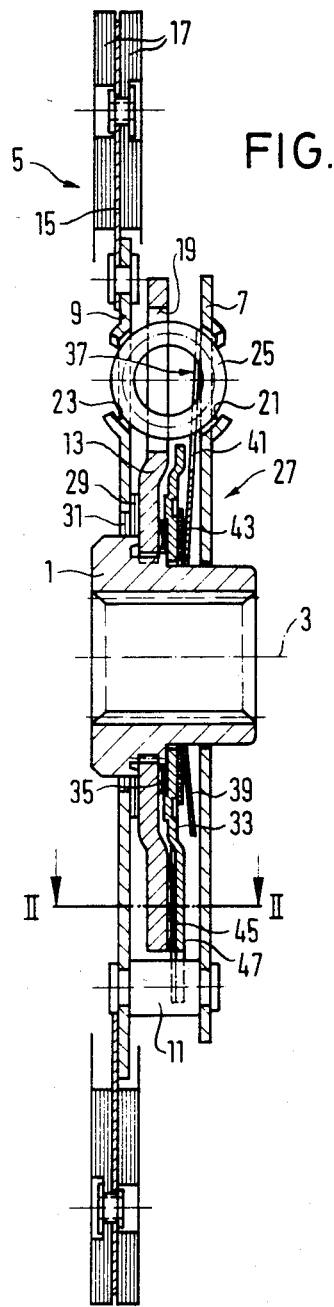
FIG. 1 shows an axial longitudinal section through a clutch disc for a motor vehicle friction clutch with controllable friction damper.

FIG. 1 shows a clutch disc of an otherwise conventional motor vehicle friction clutch having a hub 1 connectable in the usual way non-rotatably but axially displaceably with a gear input shaft (not shown). The hub 1 defines a rotation axis 3 and carries a friction lining carrier designated generally by 5. The friction lining carrier 5 is rotatable over a limited angle of rotation about the rotation axis 3 in relation to the hub 1 and comprises two cover discs 7,9 which are firmly connected with one another through distance rivets 11. The cover discs 7, 9 are arranged on axially opposite sides of a radially protruding hub disc 13 seated non-rotatably on the hub 1. A lining carrier disc 15 is riveted to the cover disc 9 and in turn carries clutch friction linings 17 radially outside the cover discs 7, 9.

In windows 19 of the hub flange 13 and windows 21, 23 of the cover discs 7, 9 there are seated helical compression springs 25, only one of which is illustrated. In the usual way the helical compression springs 25 form a torsion spring damper.

In addition to the torsion spring damper a controllable friction damper 27 is provided the friction force of which is comparatively slight in idling operation despite narrow friction force tolerances, and in operation of the friction clutch under load is substantially greater than in idling operation. The friction damper 27 comprises a friction ring 29 arranged axially between the cover disc 9 and the hub disc 13, in the radially inner region of the cover disc 9. The friction ring 29 carries an annular extension 31 which radially guides the cover disc 9 and thus the entire friction lining carrier 5 on the hub 1. Between the other cover disc 7 and the hub disc 13 there is axially displaceably arranged a presser plate 33 which annularly surrounds the hub 1. The presser plate 33 is guided non-rotatably in relation to the friction lining carrier 5 on the distance rivets 11. Axially between the hub disc 13 and the presser plate 33 a further friction ring 35 is arranged.

Figure 3:
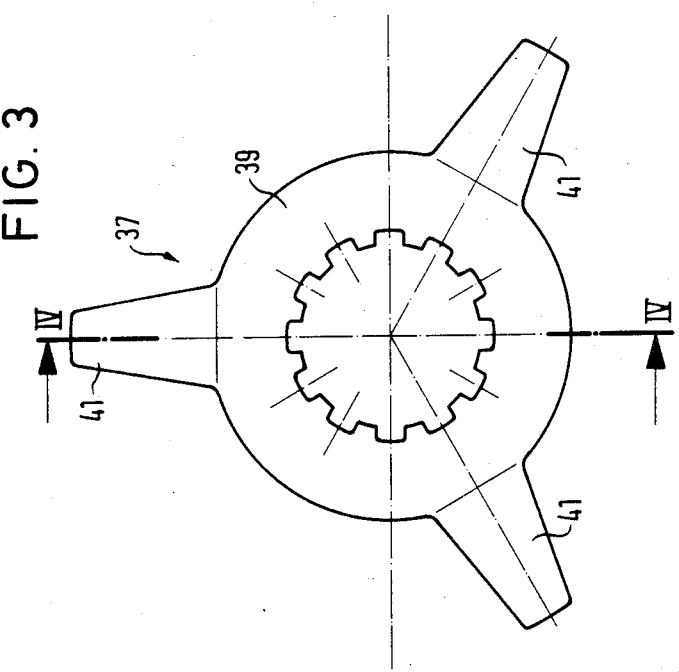
FIG. 3 shows a plan view of a spring of the friction damper of the clutch disc according to FIG. 1.
Figure 4:
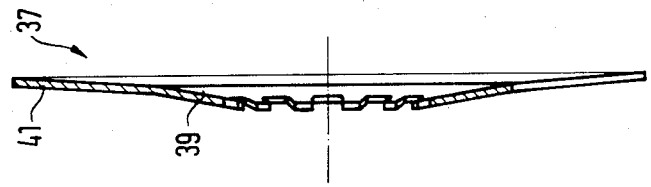
FIG. 4 shows a sectional view of the spring according to FIG. 3, seen along a line IV—IV.

A spring 37 is clamped in axially between the presser plate 33 and the cover disc 7. The spring 37 is represented in detail in FIGS. 3 and 4 and comprises a relatively hard dished spring 39 annularly surrounding the hub 1. From the external circumference of the dished spring 39 several leaf spring elements 41, three in the present example of embodiment, formed integrally on the dished spring 39 protrude radially outwards. The leaf spring elements 41 extend substantially in alignment with the dished spring 39, admittedly enclosing with the rotation axis 3 a larger angle than the generatrices of the dished spring 39. As FIG. 1 shows, the inner circumference of the dished spring 39 rests through an annular washer 43 on the presser plate 33, while the radially outer ends of the leaf spring elements 41 are supported on the cover disc 7. The leaf spring elements 41 have a relatively soft spring characteristic, that is their spring force varies only slightly in dependence upon the spring travel. On the other hand the dished spring 39 is dimensioned for a substantially greater spring force, compared with the leaf spring elements 41, and has a relatively hard spring characteristic, that is its spring force varies greatly with the spring travel.

Figure 2:
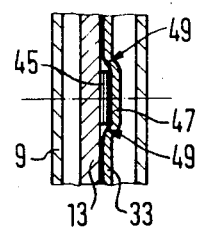
FIG. 2 shows a partial sectional view of the clutch disc according to FIG. 1, seen along a line II—II.

As may best be seen from FIG. 2, the hub disc 13 carries friction disc elements 45 which rest on the bottoms of convexities 47 of the presser plate 33. Oblique faces 49 adjoin both sides of the convexities 47 in the circumferential direction. The depth of the convexities 47 is dimensioned so that the presser plate 33 rests through the friction ring 35 on the hub disc 13 as long as the friction disc element 45 is situated in the convexity, without running up on one of the oblique faces 49. The convexity 47 is of such width that the friction lining carrier 5 can rotate through a limited angle of rotation in relation to the hub 1 without the friction disc element 45 running up on one of the oblique faces 49. The circumferential width of the convexity 47 determines the range of rotation angle for idling operation. As long as the friction disc elements 45 are seated in the convexities 47, the spring 37 bears through the free ends of the leaf spring elements 41 on the cover disc 7. In the idling range the friction force of the friction damper 27 is determined substantially by the spring force of the leaf spring elements 41, since the comparatively hard dished spring 39 is deflected only negligibly. In idling operation the cover disc 9 bears through the fricton ring 29 on the hub disc 13. Furthermore the presser plate 33, guided non-rotatably on the distance rivets 11, is supported through the friction ring 35 on the hub disc 13. The thickness of the friction disc elements 45 is dimensioned so that in the rotation angle range of idling operation they do not rest on the bottoms of the convexities 47.

With increasing angle of rotation the friction disc elements 45 are guided over the oblique faces 49 out of the convexities 47. The presser plate 33 is thereby displaced axially towards the cover disc 7. Thus the spring 37 is stressed and the presser plate 33 lifts away from the friction ring 35, while the friction disc elements 45 rest and rub on the presser plate 33. The axial stroke of the presser plate 33 is dimensioned so that the external circumference of the dished spring 39 strikes upon the cover disc 7 in the transition from the idling range of the rotation angle to the under-load range, so that the spring force of the spring 37 and thus the friction force of the friction damper 27 in operation under load are determined by the hard spring characteristic of the dished spring 39. In operation of the friction damper 27 under load the cover disc 9 again is supported through the friction ring 29 on the hub disc 13. On the other hand the presser plate 33 is supported through the friction disc elements 45 on the hub disc 13.

Figure 5:
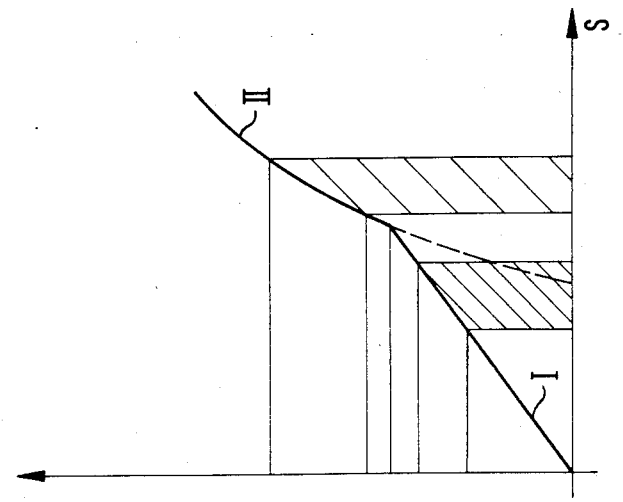
FIG. 5 shows a diagrammatic representation of the spring characteristic curve of the spring according to FIGS. 3 and 4.

The spring characteristic of the spring 37 is represented in FIG. 5. F designates the spring force in dependence upon the axial spring travel S. In a first range I the spring force varies substantially linearly and with a substantially flat course. This range is determined by the leaf spring elements 41. In the range II the spring force varies in comparatively great dependence upon the axial spring travel. In order to achieve the friction force in the idling range the spring 37 is installed under initial stress. The dimensional ratios of the clutch disc are selected so as to establish in the idling range a spring force of the range I. As FIG. 5 shows with a closely hatched region, the installation tolerances for the idling range can fluctuate within relatively large limits without the comparatively low spring force varying by the same amount. In the transition from the idling range to the under-load range the spring force increases relatively greatly, even with a relatively small variation of the spring travel. In dependence upon the oblique faces 49 in the under-load range it is possible to achieve a comparatively great variation of the spring force and thus of the friction force of the friction damper 27.

Figure 6:
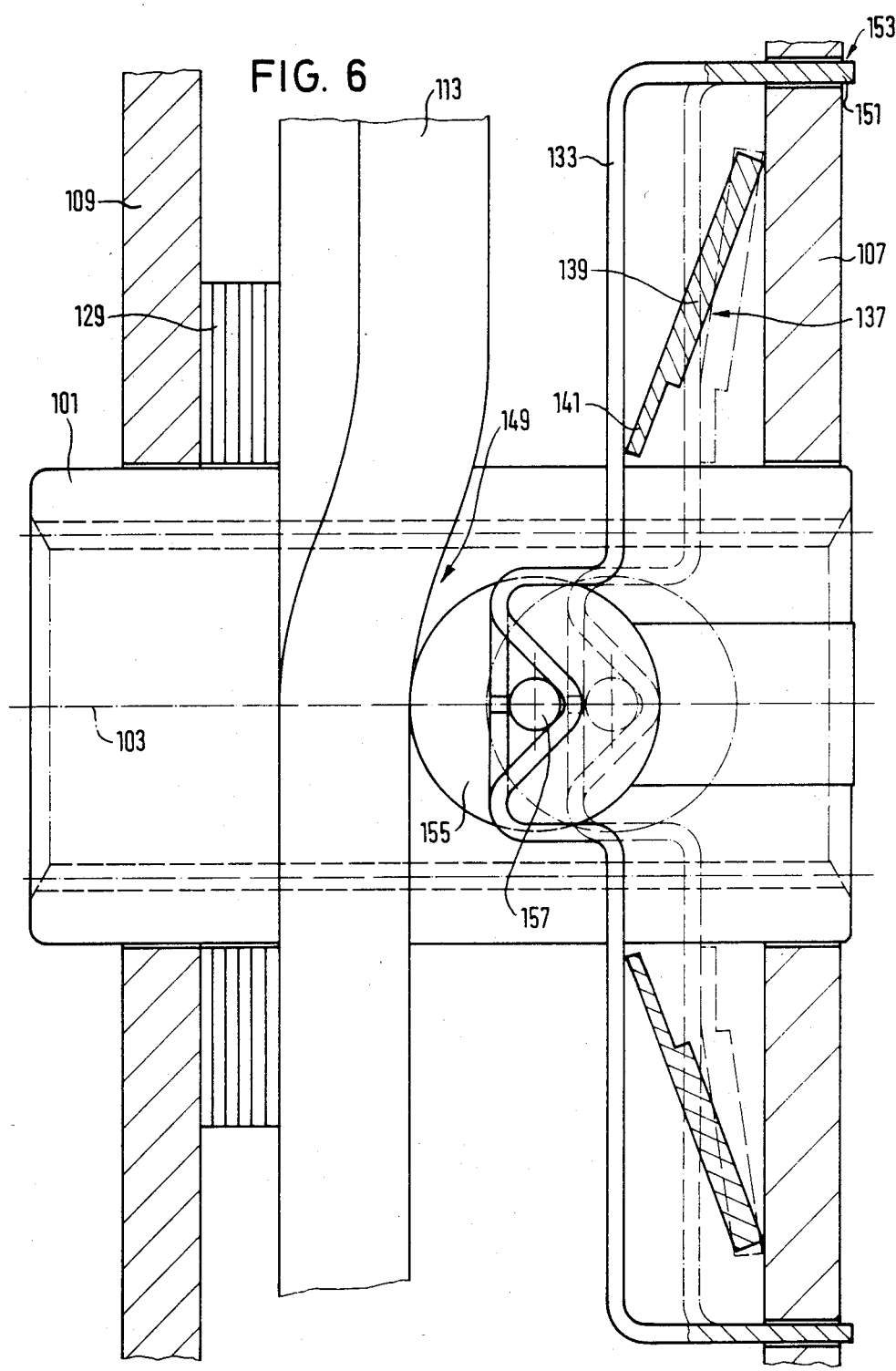
FIG. 6 shows an enlarged partial section through a second embodiment of a controllable friction damper usable in the clutch disc according to FIG. 1.

FIG. 6 shows another embodiment of the friction damper of a clutch disc for a motor vehicle friction clutch. Components which are in conformity of function with components of the clutch disc according to FIG. 1 are designated in FIG. 6 by reference numerals increased by the number 100. For more detailed explanation of the function and manner of operation of these components, reference is made to the description of FIG. 1.

Specifically FIG. 6 shows a hub 101 which defines a rotation axis 103 and carries a hub disc 113. In FIG. 6, cover discs 107, 109 of the friction lining carrier corresponding to the friction lining carrier 5 in FIG. 1 and not further illustrated are mounted axially on both sides of the hub disc 113. A friction ring 129 is arranged axially between the cover disc 109 and the hub disc 113. A presser plate 133 of annular disc form is axially displaceably provided axially between the cover disc 107 and the hub disc 113. The presser plate 133 carries axially bent-off noses 151 on its external circumference which are axially displaceable in openings 153 and couple the presser plate 133 non-rotatably with the cover disc 107. A dished spring 137 of annular disc form, which consists of a radially outer dished spring portion 139 with hard spring characteristic and a radially inwardly adjoining dished spring portion 141 with soft spring characteristic, is clamped in axially between the presser plate 133 and the cover disc 107. Furthermore rollers 155 are mounted on the presser plate 133 on spindles 157 rotatable radially of the rotation axis 103 and roll on oblique faces 149 in the case of relative rotation of the hub disc 113 and the presser plate 133 which is connected non-rotatably with the friction lining carrier. The oblique faces 149 correspond to the oblique faces 49 in FIG. 1, and displace the presser plate 133 substantially without friction in the axial direction on the rollers 155, only one of which is represented in FIG. 6.

In FIG. 6 the presser plate 133 and the spring 137 for the idling range of the friction clutch are represented in solid lines. With increasing relative angle of rotation the presser plate 133 is displaced towards the cover disc 107 and the spring 137 is compressed. The dished spring portion 141 determines the friction force in the idling range, while the friction force of the under-load range is determined by the dished spring portion 139. By reason of its smaller material cross-section only the dished spring portion 141 is elastically deformed in the idling range. On transition from the idling range to the under-load range the transition region from the dished spring portion 141 to the dished spring portion 139 strikes against the presser plate 133 and the friction force is determined substantially by the spring characteristic of the dished spring portion 139, as indicated in dot-and-dash lines. The spring characteristic of the dished spring 137 is substantially in conformity with the spring characteristic according to FIG. 5, the characteristic curve region I having a course which, while flat, is also curved like a common dished spring characteristic curve.

The friction damper according to FIG. 6 has a comparatively simple assembly, since only one single friction ring 129 is to be provided and the amount of material required for the dished spring 137 is comparatively small.

Figure 7:
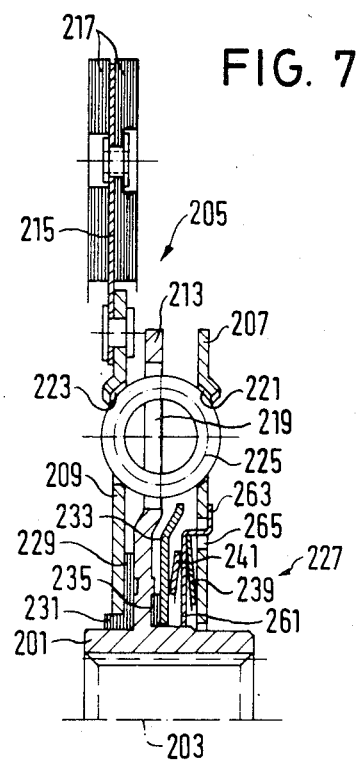
FIG. 7 shows an axial longitudinal section through the upper half of a clutch disc similar to the clutch disc according to FIG. 1, with a third embodiment of a controllable friction damper.

FIG. 7 shows a variant of the embodiment according to FIG. 1. For the explanation of components of like effect the reference numerals of FIG. 1 are increased by the number 200 in FIG. 7, and reference is made to the description of FIG. 1. Specifically the elements 1 to 9 and 13 to 35 of FIG. 1 correspond to the elements 201 to 209 and 213 to 235. The thrust face devices necessary for the axial displacement of the presser plate 233 can correspond to the thrust face devices 45, 47, 49 of FIG. 1 or to the thrust face devices 149, 155, 157 of FIG. 6.

The friction damper 227 in FIG. 7 differs from the friction damper 27 essentially only in the configuration of its spring arrangement which comprises two mutually separated dished springs 239 and 241. The dished springs 239, 241 are clamped, in series with one another, in between the presser plate 233 and the axially adjacent cover disc 207. Between the dished springs 239, 241 an initial-stress disc 261 is arranged on the external circumference of which tabs 263 are formed which pass axially displaceably through openings 265 of the cover disc 207 and grasp behind the cover disc 207 on the side axially remote from the dished spring 239. The initial-stress disc 261 holds the dished spring 239 with initial stress on the cover disc 207, independently of the dished spring 241.

The dished spring 241 has a relatively soft spring characteristic and substantially determines the friction force of the friction damper 227 in idling. The dished spring 239 is initially stressed by the initial-stress disc 261 to a spring force greater than the operationally maximal spring force of the dished spring 241. It can have a harder or equally a softer spring characteristic than the dished spring 241.

Figure 8:
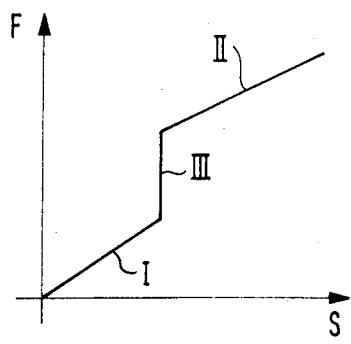
FIGS. 8 and 9 show examples of embodiment for spring characteristic curves which are achievable with a friction damper in conformity with the clutch disc according to FIG. 7.
Figure 9:
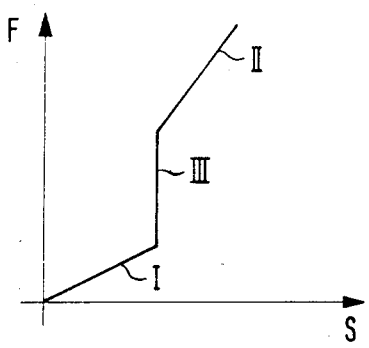

In damping operation the thrust device (not further illustrated) shifts the presser plate 233 in relation to the cover disc 207. In the transition from idling operation to under-load operation the presser plate 233, through the then flattened dished spring 241, abuts on the initial-stress disc 261. The dished spring 239 is deflected only after its initial stress force is overcome. In the transition from the idling range to the under-load range the spring force and thus the friction force of the friction damper vary abruptly. This is illustrated in FIGS. 8 and 9 for two variants of embodiments of the dished springs 239, 241. FIGS. 8 and 9 show the total spring force F of such a spring arrangement in dependence upon the axial spring travel S. In FIG. 8 the dished spring 241 determining the idling range has a harder spring characteristic than the dished spring 239, which determines the under-load range but is initially stressed. Curve I shows the spring characteristic of the dished spring 241. Curve II shows the spring characteristic of the initially stressed dished spring 239. The spring force varies abruptly according to curve III when the presser plate 233, after the flattening of the dished spring 241, strikes upon the initial-stress disc 261. In FIG. 9 the spring characteristic of the dished spring 239 (curve II) is harder than the spring characteristic of the dished spring 241 (curve I). Here again in conformity with the initial stress of the dished spring 239 the spring force varies abruptly (curve III) in the transition from the idling range to the under-load range.

Figure 10:
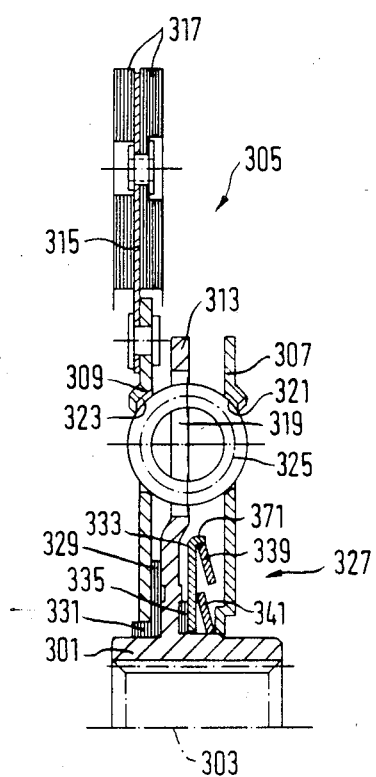
FIG. 10 shows a longitudinal section through the upper half of a clutch disc similar to the clutch disc according to FIG. 1, with a fourth embodiment of a controllable friction damper.

FIG. 10 shows a further variant of the clutch disc according to FIG. 1. For the indication of parts of like effect the reference numerals of FIG. 1 are increased by the number 300, and for more detailed explanation reference is made to the description of FIG. 1. Specifically the parts 1 to 9 and 13 to 35 of FIG. 1 correspond to the parts 301 and 309 and 313 to 335 of FIG. 10. The thrust devices of the friction damper 327 are not individually illustrated; they can correspond to the elements 45, 47, 49 of FIG. 1 or the elements 149, 155, 157 of FIG. 6.

The friction damper 327 according to FIG. 10 differs from the friction damper 27 according to FIG. 1 essentially in the nature of the friction force generation. For this purpose two mutually independent dished springs 339, 341 are provided which, in contrast to springs as explained hitherto, come into use not in series but parallel to one another. The dished spring 341 has a soft spring characteristic and is separately clamped in between the presser plate 333 and the adjacent cover disc 307. The dished spring 341 determines the friction force of the friction damper 327 in idling operation. The dished spring 339 is guided radially on a shoulder 371 of the presser plate 333 at a distance from the cover disc 307. In the transition from the idling range to the under-load range the dished spring 339 abuts on the cover disc 307 so that the friction force of the friction damper 327 is determined by the parallel combination of the springs 339, 341. The dished spring 339 preferably has a harder spring characteristic than the dished spring 341, in order to achieve a considerable increase of the spring force in the transition from the idling range to the under-load range.

The dished spring 339 can of course also be guided radially on the cover disc 307 and extend at a distance from the presser plate 333 in the idling range. Moreover an initial-stress disc similar to the initial-stress disc 261 of FIG. 7 can be allocated to the dished spring 339, and initially stresses the dished spring 339 independently of the dished spring 341. In this way in this embodiment again an abrupt variation of the spring force can be achieved in the transition from the idling range to the under-load range.

While specific embodiments of the invention have been shown and described in detail to illustrate the application of the inventive principles, it will be understood that the invention may be embodied otherwise without departing from such principles.

What is claimed is:
1. In a motor vehicle clutch comprising:
   a hub which defines a axis of rotation,
   a friction lining carrier rotatably guided on the hub and rotatable through a limited angle of rotation in relation to the hub about the rotation axis, at least one damping spring stressable in the relative rotation of the hub and the friction lining carrier, a friction damper device effective, in the relative rotation of the hub and the friction lining carrier, between these parts, having at least two friction faces resting against one another and moving with rubbing against one another in the relative rotation, and spring means clamped in between the hub and the friction lining carrier and determining the force exerted upon the friction faces, said spring means comprising a first spring member and a second spring member, of which the first spring member at every relative angle of rotation exerts a spring force upon the friction faces, an oblique face thrust device operationally arranged in the clamped in path of the spring means between said hub and said friction lining carrier for controlling the force exerted upon the friction faces in dependence upon the relative angle of rotation between the hub and the friction lining carrier, said oblique face thrust device including a stop part arranged in the clamped in path of the spring means for displacing the stop part and the second spring member in relation to one another, in dependence upon the relative angle of rotation between hub and friction lining carrier, the stop part being lifted by the oblique face thrust device in a first range of the relative angle of rotation away from the second spring member while the first spring member provides the force exerted on the friction faces and resting by way of the oblique face thrust device on the second spring member in at least one second range of the relative angle of rotation, so that the second spring member generates a spring force increased in comparison with the spring force exerted in the first range upon the friction faces.

2. A clutch according to claim 1, wherein the first spring member has a softer spring characteristic than the second spring member.

3. A clutch according to claim 2, wherein the two spring members are arranged in series with one another in the clamped in path.

4. A clutch according to claim 3, wherein the first spring member is arranged in the clamped in path of the spring means between the stop part and the second spring member and wherein the stop part, after a maximum spring travel of the first spring member is used, in the second range of the relative angle of rotation rests on the second spring member, one of directly and through the first spring member.

5. A clutch according to claim 4, wherein the spring means is formed as a dished spring of substantially annular disc form, which has slighter thickness in a first annular dished spring portion forming the first spring member than in a second annular dished spring portion radially adjoining the first portion and forming the second spring member.

6. A clutch according to claim 5, wherein the first dished spring portion is arranged radially within the second dished spring portion.

7. A clutch according to claim 4, wherein the second spring member is formed as a dished spring of substantially annular disc form on the circumference of which there are held several leaf spring elements arranged in distribution over the circumference, protruding radially and forming the first spring member.

8. A clutch according to claim 7, wherein each leaf spring element is formed in one piece on the external circumference of the dished spring and in the first range extends substantially in alignment with the dished spring.

9. A clutch according to claim 1, wherein the two spring members are arranged parallel to one another in the spring force path.

10. A clutch according to claim 9, wherein the first spring member has a softer spring characteristic than the second spring member.

11. A clutch according to claim 1, wherein to the second spring member there is allocated an initial-stress element which loads the second spring member with a predetermined initial stress force even when the stop part is lifted away.

12. A clutch according to claim 1, wherein the hub carries a radially protruding hub disc and the friction lining carrier comprises two cover discs firmly connected with one another and arranged on axially opposite sides of the hub disc, wherein a friction ring is arranged between a first one of the two cover discs and the hub disc, wherein a presser plate which annularly surrounds the hub is arranged axially movably but non-rotatably in relation to the friction lining carrier axially between the hub disc and the second of the two cover discs, said spring means being arranged axially between the presser plate and the second cover disc and said oblique face thrust device being arranged axially between the hub disc and the presser plate and comprising at least one of dogs and oblique faces arranged on at least one of the hub disc and the presser plate which displace the presser plate axially in relation to the second cover disc in the relative rotation of hub disc and presser plate.

13. A clutch according to claim 12, wherein oblique faces are formed on the hub disc and wherein rollers rotatable about radial rotation axes are mounted on the presser plate, which rollers roll on the oblique faces in the relative rotation of hub disc and presser plate.

14. A clutch according to claim 12, wherein the stop part is formed by one of the presser plate and the second cover plate.

15. A clutch according to claim 12, wherein a further friction ring is arranged axially between the hub disc and the presser plate and wherein the oblique face thrust device lifts the presser plate away from the further friction ring in the second range of the relative angle of rotation.

16. A clutch according to claim 15, wherein the further friction ring is arranged radially within the diameter range containing the oblique faces.

17. A clutch according to claim 15, wherein the oblique face thrust device includes the oblique faces for the one part and the dogs formed as friction discs for the other part.

18. A clutch according to claim 12, wherein the oblique faces extend substantially over the whole first range and the whole second range of the relative angle of rotation between hub and friction lining carrier.

* * * * *